US012647033B2

(12) United States Patent
Wu et al.

(10) Patent No.: US 12,647,033 B2
(45) Date of Patent: Jun. 2, 2026

(54) POWER CONVERTER FOR DYNAMICALLY ADJUSTING VOLTAGE HEADROOM BASED ON CURRENT

(71) Applicant: ANPEC ELECTRONICS CORPORATION, Hsinchu (TW)

(72) Inventors: Jyun-Heng Wu, Hsinchu City (TW); Kun-Yi Lin, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 201 days.

(21) Appl. No.: 18/792,503

(22) Filed: Aug. 1, 2024

(65) Prior Publication Data

US 2025/0337327 A1      Oct. 30, 2025

(30) Foreign Application Priority Data

Apr. 29, 2024    (TW) ................................. 113115877

(51) Int. Cl.
H02M 3/158         (2006.01)
H02M 1/00          (2007.01)
H02M 1/32          (2007.01)
(52) U.S. Cl.
CPC ......... H02M 3/158 (2013.01); H02M 1/0009 (2021.05); H02M 1/0025 (2021.05); H02M 1/32 (2013.01)

(58) Field of Classification Search
CPC .. H02M 3/158; H02M 1/0009; H02M 1/0025; H02M 1/0048
See application file for complete search history.

(56) References Cited

U.S. PATENT DOCUMENTS

2019/0068046 A1 *    2/2019  Xue ......................... H02M 1/08
2021/0305899 A1 *    9/2021  Hsieh .................. H02M 1/0035
2022/0413538 A1 *   12/2022  Liu .......................... H03M 1/66
2025/0253754 A1 *    8/2025  Kung .................. H02M 1/0009

FOREIGN PATENT DOCUMENTS

CN            106602876 A  *  4/2017  ............ H02M 3/158

* cited by examiner

*Primary Examiner* — Sisay G Tiku
(74) *Attorney, Agent, or Firm* — Li & Cai Intellectual Property Office

(57)          ABSTRACT
A power converter for dynamically adjusting voltage headroom based on a current is provided. The power converter includes a high-side switch, a low-side switch, a sensor circuit, a current source, a mirror circuit, a reference voltage adjusting circuit and a control circuit. The sensor circuit senses a current flowing through a power receiving component to output a sensed current to a first terminal of a first transistor of a current mirror. A first terminal of the second transistor of the current mirror is connected to the current source. The reference voltage adjusting circuit sets a reference voltage according to a current from a node between the first terminal of the second transistor and the current source. The control circuit controls the high-side switch and the low-side switch according to the reference voltage.

20 Claims, 8 Drawing Sheets

POWER CONVERTER FOR DYNAMICALLY ADJUSTING VOLTAGE HEADROOM BASED ON CURRENT

CROSS-REFERENCE TO RELATED PATENT APPLICATION

This application claims the benefit of priority to Taiwan Patent Application No. 113115877, filed on Apr. 29, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a power converter for dynamically adjusting voltage headroom based on a current.

BACKGROUND OF THE DISCLOSURE

Power converters are indispensable for electronic devices Conventional power converters are used to adjust power and supply the adjusted power to the electronic devices. A high-side switch and a low side switch of the conventional power converter must be switched according to voltages or currents of circuit components in the conventional power converter such that the conventional power converter supplies appropriate power to a load. However, a driver circuit of the conventional power converter adjusts an output voltage of the conventional power converter while retaining constant voltage headroom. As a result, the driver circuit does not most appropriately adjust the output voltage of the conventional power converter according to a change in a current set for the electronic device.

SUMMARY OF THE DISCLOSURE

In response to the above-referenced technical inadequacies, the present disclosure provides a power converter for dynamically adjusting voltage headroom based on a current. The power converter includes a high-side switch, a low-side switch, a sensor circuit, a current source, a mirror circuit, a reference voltage adjusting circuit and a control circuit. A first terminal of the high-side switch is coupled with an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of an inductor. The sensor circuit is connected to a power receiving component. The power receiving component is connected to a second terminal of the inductor. The sensor circuit is configured to sense a current flowing to the power receiving component to output a sensed current. The current source has an input terminal coupled with the input voltage. The mirror circuit includes a first transistor and a second transistor. A first terminal of the first transistor is connected to the sensor circuit. A second terminal of the first transistor is grounded. A first terminal of the second transistor is connected to the first terminal and a control terminal of the first transistor. A first terminal of the second transistor is connected to an output terminal of the current source. A second terminal of the second transistor is grounded. The reference voltage adjusting circuit is connected to a reference node between the first terminal of the second transistor and the output terminal of the current source. The current source supplies a set current to the reference node. The reference voltage adjusting circuit sets a reference voltage according to a current that flows from the reference node to the reference voltage adjusting circuit. The control circuit is connected to the reference voltage adjusting circuit, a control terminal of the high-side switch and a control terminal of the low-side switch. The control circuit is configured to control the high-side switch and the low-side switch according to the reference voltage.

As described above, the present disclosure provides the power converter for dynamically adjusting the voltage headroom based on the current. The power converter of the present disclosure senses a change in a current flowing to the power receiving component such as the light-emitting diode. The power converter of the present disclosure dynamically adjusts control of the high-side switch and the low-side switch in real time according to the change in the sensed current so as to adjust the current flowing to the light-emitting diode sequentially through the inductor and the switch circuit for adjusting voltages of the light-emitting diode and the switch circuit. As a result, the voltage headroom is dynamically adjusted with the change in the current. Therefore, by the power converter of the present disclosure, the light-emitting diode and the switch circuit are prevented from being damaged due to overvoltage. Furthermore, any unnecessary power consumption in the power converter of the present disclosure can be avoided, so that the power converter can drive the light-emitting diode to emit light as desired under minimum power loss.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
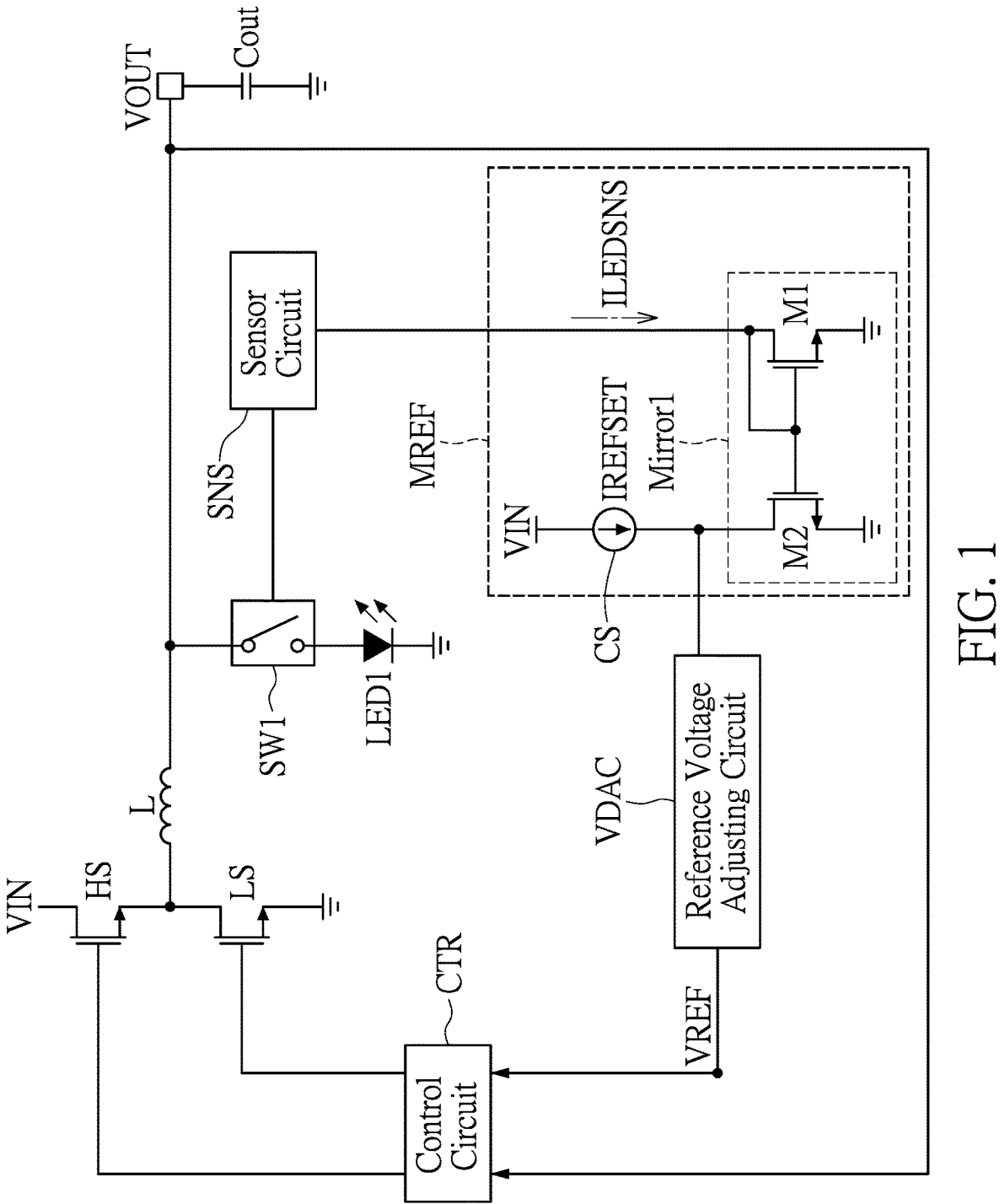
FIG. 1 is a block diagram of a power converter for dynamically adjusting voltage headroom based on a current according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a block diagram of a power converter for dynamically adjusting voltage headroom based on a current according to a first embodiment of the present disclosure.

As shown in FIG. 1, in the first embodiment, the power converter of the present disclosure includes a high-side switch HS, a low-side switch LS, a feedback circuit MREF, a reference voltage adjusting circuit VDAC and a control circuit CTR. In particular, the feedback circuit MREF includes a current source CS and a mirror circuit Mirror1. The mirror circuit Mirror1 includes a first transistor M1 and a second transistor M2.

A first terminal of the high-side switch HS is coupled with an input voltage VIN.

A first terminal of the low-side switch LS is connected to a second terminal of the high-side switch HS. A second terminal of the low-side switch LS is grounded. A node between the first terminal of the low-side switch LS and the second terminal of the high-side switch HS is connected to a first terminal of an inductor L. A second terminal of the inductor L is connected to a first terminal of an output capacitor Cout. A second terminal of the output capacitor Cout is grounded. The second terminal of the inductor L or of the first terminal of the output capacitor Cout is used as an output terminal of the power converter of the present disclosure. A voltage of the output terminal of the power converter of the present disclosure is an output voltage VOUT shown in FIG. 1.

The switch circuit SW1 may be connected between the second terminal of the inductor L and a power receiving component LED1. The switch circuit SW1 may include a switch component as shown in FIG. 1, but the present disclosure is not limited thereto. In practice, the switch circuit SW1 may also include a plurality of switch components. As shown in FIG. 1, a first terminal of the switch component included in the switch circuit SW1 is connected to the second terminal of the inductor L. A second terminal of the switch component included in the switch circuit SW1 is connected to a first terminal of the power receiving component LED1. A second terminal of the power receiving component LED1 is grounded.

The power receiving component LED1 described herein may include a light-emitting component such as a light-emitting diode shown in FIG. 1, but the present disclosure is not limited thereto. An anode of the power receiving component LED1 such as the light-emitting diode is connected to the second terminal of the switch component included in the switch circuit SW1. A cathode of the power receiving component LED1 such as the light-emitting diode is grounded.

The sensor circuit SNS may be connected to the first terminal of the power receiving component LED1, or may be connected to the first terminal, the second terminal or a control terminal of the switch component included in the switch circuit SW1.

A first terminal of the first transistor M1 of the mirror circuit Mirror1 is connected to an output terminal of the sensor circuit SNS. A second terminal of the first transistor M1 is grounded.

A control terminal of the second transistor M2 of the mirror circuit Mirror1 is connected to the first terminal or a control terminal of the first transistor M1. A first terminal of the second transistor M2 is connected to an output terminal of the current source CS. An input terminal of the current source CS may be coupled with the input voltage VIN.

The reference voltage adjusting circuit VDAC is connected to a reference node between the first terminal of the second transistor M2 and the output terminal of the current source CS.

The control circuit CTR is connected to the reference voltage adjusting circuit VDAC, a control terminal of the high-side switch HS and a control terminal of the low-side switch LS.

The control circuit CTR may be further connected to the first terminal of the output capacitor Cout. The control circuit CTR may control the high-side switch HS and the low-side switch LS according to a voltage of the first terminal of the output capacitor Cout.

It is worth noting that, the power converter of the present disclosure dynamically adjusts voltage headroom as described below.

The reference voltage adjusting circuit VDAC initially sets a reference voltage VREF to be equal to a maximum reference voltage value VREFMAX, and outputs the reference voltage VREF having the maximum reference voltage value VREFMAX. The maximum reference voltage value VREFMAX may be adjusted according to actual requirements.

The control circuit CTR controls the high-side switch HS and the low-side switch LS according to the maximum reference voltage value VREFMAX of the reference voltage VREF from the reference voltage adjusting circuit VDAC.

When the control circuit CTR turns on the high-side switch HS and turns off the low-side switch LS, a current flows through the high-side switch HS from the input voltage VIN to the inductor L, and then at least part of the current flows to the switch circuit SW1 to the power receiving component LED1.

The sensor circuit SNS senses the current that flows to the switch circuit SW1 sequentially through the high-side switch HS and the inductor L from the input voltage VIN, or senses the current that flows to the power receiving component LED1 sequentially through the high-side switch HS, the inductor L and the switch circuit SW1 from the input voltage VIN, to output a sensed current ILEDSNS to the first terminal of the first transistor M1 of the mirror circuit Mirror1.

For convenience of explanation, a node between the first terminal of the second transistor M2 of the mirror circuit Mirror1 and the output terminal of the current source CS is used as the reference node as described below.

When a set current IREFSET supplied to the reference node by the current source CS, one part of the set current IREFSET flows to the reference voltage adjusting circuit VDAC from the reference node, and the other part of the set current IREFSET flows to the first terminal of the second transistor M2 of the mirror circuit Mirror1 from the reference node.

In practice, the current source CS may be a variable current source, and a current value of the set current IREFSET supplied by the current source CS may be a variable current value.

A ratio of the sensed current ILEDSNS flowing through the first terminal of the first transistor M1 of the mirror circuit Mirror1 (as an input current of the mirror circuit Mirror1) to a current flowing through the first terminal of the second transistor M2 (as an output current of the mirror circuit Mirror1) may be 1:N, where N is an appropriate positive value and may be a variable value.

The set current IREFSET supplied to the reference node is equal to a sum of the current that flows to the reference voltage adjusting circuit VDAC from the reference node and the current that flows to the first terminal of the second transistor M2 from the reference node. The current that flows through the first terminal of the second transistor M2 is N times the sensed current ILEDSNS flowing through the first terminal of the first transistor M1.

If the ratio of the sensed current ILEDSNS flowing through the first terminal of the first transistor M1 to the current flowing through the first terminal of the second transistor M2 is 1:1 (N=1), the sensed current ILEDSNS flowing through the first terminal of the first transistor M1 is equal to the current flowing through the first terminal of the second transistor M2. Under this condition, the set current IREFSET supplied to the reference node is equal to a sum of the current that is received from the reference node by the reference voltage adjusting circuit VDAC and the sensed current ILEDSNS flowing through the first terminal of the first transistor M1.

When the set current IREFSET supplied to the reference node by the current source CS is maintained at a constant current value, the current that is received from the reference node by the reference voltage adjusting circuit VDAC is decreased with an increase in the sensed current ILEDSNS flowing through the first terminal of the first transistor M1, and is increased with a decrease in the sensed current ILEDSNS flowing through the first terminal of the first transistor M1.

The reference voltage adjusting circuit VDAC sets or adjusts the reference voltage VREF according to the current from the reference node between the first terminal of the second transistor M2 of the mirror circuit Mirror1 and the output terminal of the current source CS. The reference voltage adjusting circuit VDAC outputs the reference voltage VREF to the control circuit CTR.

The control circuit CTR controls the high-side switch HS and the low-side switch LS according to the reference voltage VREF from the reference voltage adjusting circuit VDAC.

That is, the power converter of the present disclosure senses the current flowing through the switch circuit SW1 or the power receiving component LED1 such as the light-emitting diode, and adjusts control of the high-side switch HS and the low-side switch LS according to the sensed current. Therefore, the power converter of the present disclosure is capable of dynamically adjusting voltage headroom of the power converter so as to adjust power consumption on the switch circuit SW1 such that a voltage of the switch circuit SW1 does not exceed a maximum voltage that the switch circuit SW1 can withstand. As a result, the switch circuit SW1 is prevented from being damaged due to overvoltage. Therefore, by the power converter of the present disclosure, a desired lighting state of the power receiving component LED1 such as the light-emitting diode connected to the power converter of the present disclosure is achieved, while unnecessary power consumption is reduced.

Figure 2:
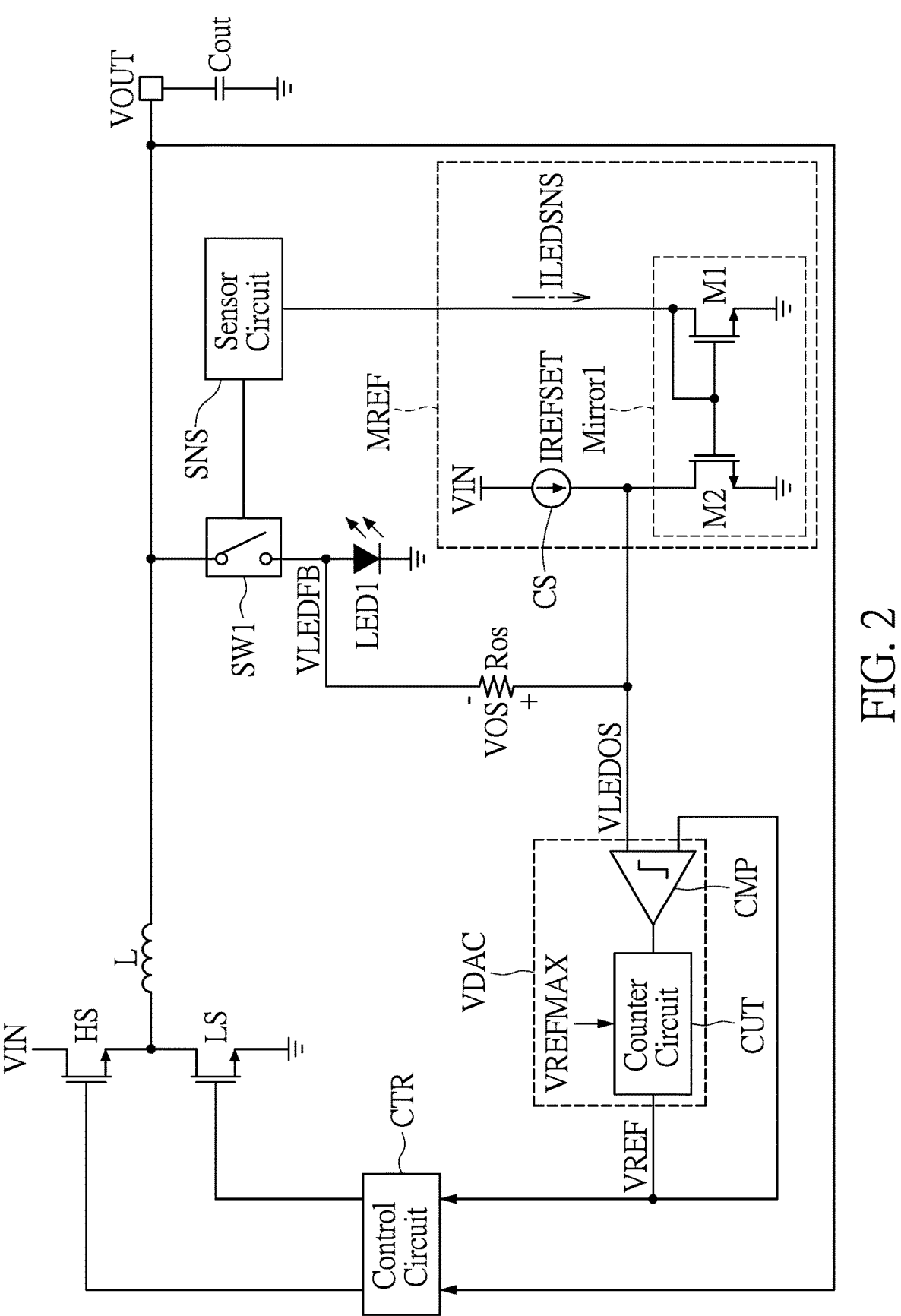
FIG. 2 is a block diagram of a power converter for dynamically adjusting voltage headroom based on a current according to a second embodiment of the present disclosure.

Reference is made to FIG. 2, which is a block diagram of a power converter for dynamically adjusting voltage headroom based on a current according to a second embodiment of the present disclosure.

The descriptions of the second embodiment of the present disclosure that are the same as the descriptions of the first embodiment of the present disclosure are not repeated herein.

A difference between the second and first embodiments of the present disclosure is that, in the second embodiment, the reference voltage adjusting circuit VDAC of the present disclosure includes a comparator CMP and a counter circuit CUT as shown in FIG. 2.

A first input terminal of the comparator CMP is connected to the reference node between the first terminal of the second transistor M2 and the output terminal of the current source CS.

An input terminal of the counter circuit CUT is connected to an output terminal of the comparator CMP. An output terminal of the counter circuit CUT is connected to the control circuit CTR and the second input terminal of the comparator CMP.

If necessary, as shown in FIG. 2, the power converter of the present disclosure may further include a resistor Ros. A first terminal of the resistor Ros is connected to the anode of the power receiving component LED1 such as the light-emitting diode. A second terminal of the resistor Ros is connected to the first input terminal of the comparator CMP.

It is worth noting that, the counter circuit CUT of the reference voltage adjusting circuit VDAC initially sets the reference voltage VREF to be equal to the maximum reference voltage value VREFMAX.

Then, the control circuit CTR controls the high-side switch HS and the low-side switch LS according to the maximum reference voltage value VREFMAX of the reference voltage VREF from the reference voltage adjusting circuit VDAC.

The first input terminal of the comparator CMP receives a voltage from the feedback circuit MREF, and the second input terminal of the comparator CMP receives the reference voltage VREF by the counter circuit CUT. The comparator CMP compares the voltage from the feedback circuit MREF with the reference voltage VREF having the maximum reference voltage value VREFMAX to output a determining signal for determining whether the counter circuit CUT decreases the reference voltage VREF.

The counter circuit CUT determines whether the power receiving component LED1 such as the light-emitting diode has sufficient voltage headroom according to the determining signal from the comparator CMP.

When the counter circuit CUT determines that the power receiving component LED1 such as the light-emitting diode has the sufficient voltage headroom according to the deter-mining signal from the comparator CMP, the counter circuit CUT counts down the reference voltage VREF from the maximum reference voltage value VREFMAX for decreas-ing the reference voltage VREF from the maximum refer-ence voltage value VREFMAX.

The control circuit CTR, according to the reference volt-age VREF being smaller than the maximum reference volt-age value VREFMAX, controls the high-side switch HS and the low-side switch LS such that the current that flows to the switch circuit SW1 sequentially through the high-side switch HS and the inductor L is decreased for decreasing the voltage of the switch circuit SW1.

The comparator CMP compares the voltage from the feedback circuit MREF with the reference voltage VREF being smaller than the maximum reference voltage value VREFMAX to output the determining signal to the counter circuit CUT.

The counter circuit CUT may count down the reference voltage VREF multiple times for decreasing the reference voltage VREF multiple times.

When the counter circuit CUT determines that a head-room voltage of the power receiving component LED1 such as the light-emitting diode reaches a minimum headroom voltage value according to the determining signal from the output terminal of the comparator CMP, the counter circuit CUT stops counting down the reference voltage VREF and stops decreasing the reference voltage VREF. At this time, the counter circuit CUT maintains the reference voltage VREF.

Finally, the control circuit CTR continually controls the high-side switch HS and the low-side switch LS according to the maintained reference voltage VREF. Therefore, by the power converter of the present disclosure, the switch circuit SW1 is prevented from being damaged due to overvoltage.

Figure 3:
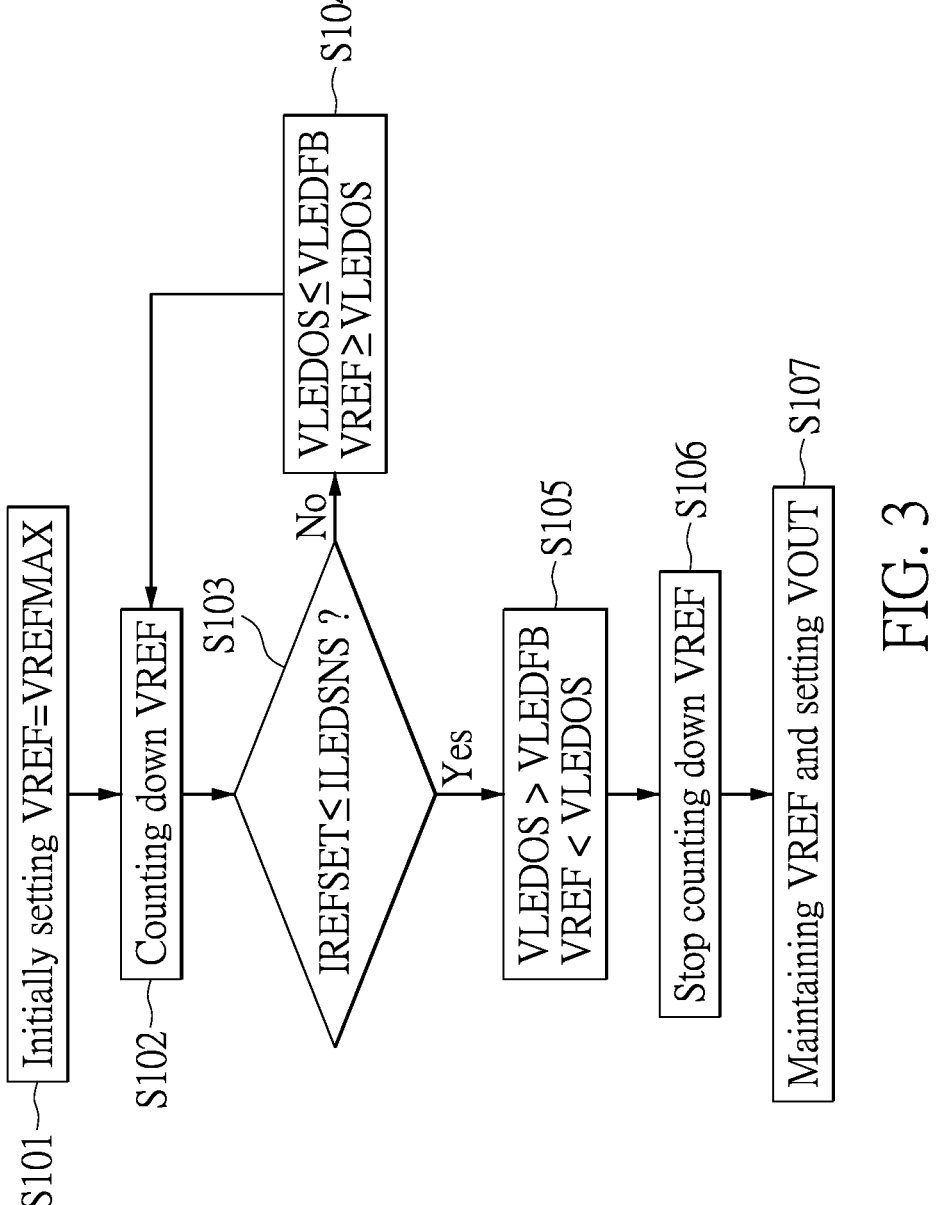
FIG. 3 is a flowchart diagram of steps of a power converter for dynamically adjusting voltage headroom based on a current according to a third embodiment of the present disclosure.

Reference is made to FIG. 3, which is a flowchart diagram of steps of a power converter for dynamically adjusting voltage headroom based on a current according to a third embodiment of the present disclosure.

The power converter of the present disclosure such as the power converter shown in FIG. 1 or FIG. 2 may perform processes S101 to S107 shown in FIG. 3.

After the counter circuit CUT of the reference voltage adjusting circuit VDAC initially sets the reference voltage VREF to be equal to the maximum reference voltage value VREFMAX (in process S101), the counter circuit CUT counts down the reference voltage VREF from the maximum reference voltage value VREFMAX for decreasing the reference voltage VREF (in process S102).

When the set current IREFSET supplied by the current source CS is smaller than or equal to the sensed current ILEDSNS that is outputted according to the current flows to the switch circuit SW1 by the sensor circuit SNS (in process S103), a voltage VLEDOS of the first input terminal of the comparator CMP is lower than or equal to a voltage VLEDFB of the power receiving component LED1 such as the light-emitting diode (in process S104). At the same time, the reference voltage VREF that is outputted to the control circuit CTR and the second input terminal of the comparator CMP by the reference voltage adjusting circuit VDAC is higher than the voltage VLEDOS of the first input terminal of the comparator CMP (in process S104).

Then, when the voltage VLEDOS of the first input terminal of the comparator CMP is lower than or equal to the voltage VLEDFB of the power receiving component LED1 and the reference voltage VREF outputted by the reference voltage adjusting circuit VDAC is higher than or equal to the voltage VLEDOS (in process S104), the counter circuit CUT continually counts down for decreasing the reference volt-age VREF (in process S102).

Conversely, when the set current IREFSET supplied by the current source CS is larger than the sensed current ILEDSNS that is outputted according to the current flows to the switch circuit SW1 by the sensor circuit SNS (in process S103), the voltage VLEDOS of the first input terminal of the comparator CMP is higher than the voltage VLEDFB of the power receiving component LED1 (in process S105). At the same time, the reference voltage VREF that is outputted by the reference voltage adjusting circuit VDAC is lower than the voltage VLEDOS of the first input terminal of the comparator CMP (in process S105).

Then, when the voltage VLEDOS of the first input terminal of the comparator CMP is higher than the voltage VLEDFB of the power receiving component LED1 and the reference voltage VREF outputted by the reference voltage adjusting circuit VDAC is lower than the voltage VLEDOS (in process S105), the counter circuit CUT stops counting down the reference voltage VREF and stops decreasing the reference voltage VREF (in process S106).

After the counter circuit CUT stops counting down the reference voltage VREF (in process S106), the control circuit CTR controls the high-side switch HS and the low-side switch LS according to the reference voltage VREF that is counted down finally to control the output voltage VOUT of the power converter to an appropriate value (in process S107). As a result, the switch circuit SW1 that is connected to the second terminal of the inductor L as the output terminal of the power converter of the present dis-closure is prevented from being damaged due to overvolt-age, and the power receiving component LED1 such as the light-emitting diode can emit light as desired by using enough power from the power converter of the present disclosure.

Figure 4:
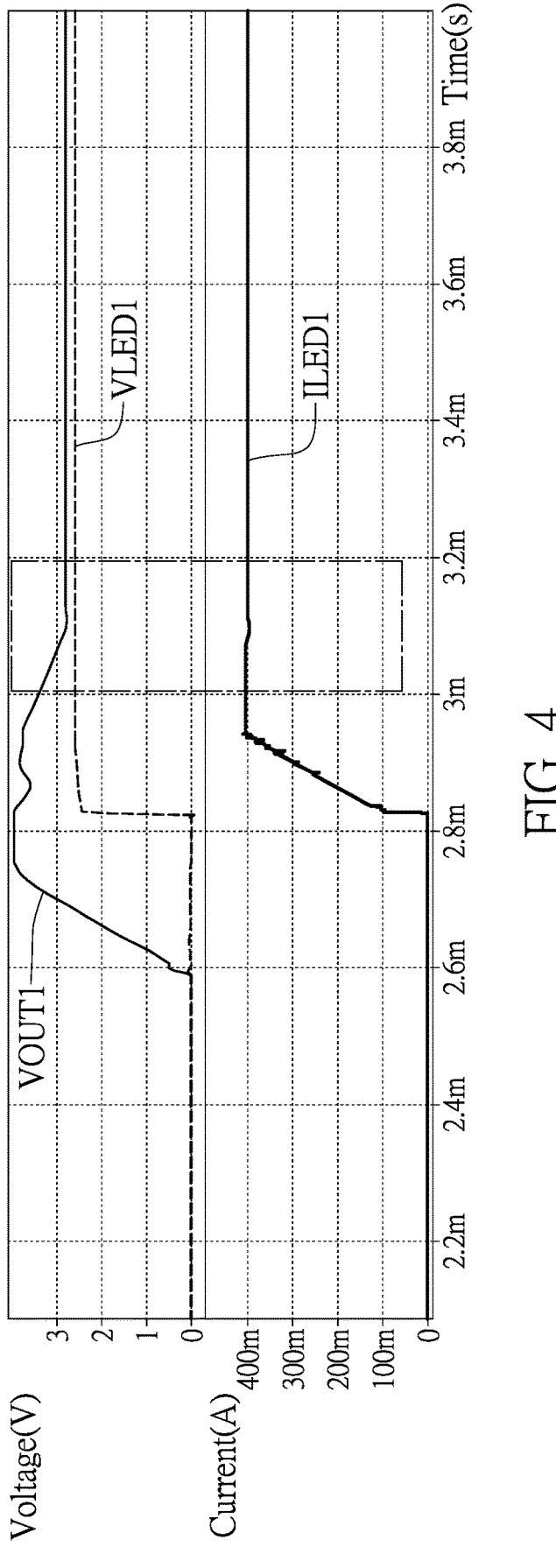
FIG. 4 is a waveform diagram of signals of the power converter for dynamically adjusting the voltage headroom based on the current according to the first to third embodiments of the present disclosure.

Reference is made to FIG. 4, which is a waveform diagram of signals of the power converter for dynamically adjusting the voltage headroom based on the current accord-ing to the first to third embodiments of the present disclo-sure.

The output voltage VOUT of the second terminal of the inductor L of the power converter as shown in FIG. 1 or FIG. 2 may be equal to an output voltage VOUT1 shown in FIG. 4.

A voltage of the power receiving component LED1 such as the light-emitting diode as shown in FIG. 1 or the voltage VLEDFB of the power receiving component LED1 as shown in FIG. 2 may be equal to a voltage VLED1 shown in FIG. 4.

The current flowing through the power receiving component LED1 such as the light-emitting diode as shown in FIG. 1 or FIG. 2 is equal to a current ILED1 shown in FIG. 4.

A voltage difference between the output voltage VOUT1 of the power converter and the voltage VLED1 of the power receiving component LED1 such as the light-emitting diode is a voltage that the switch circuit SW1 withstands.

As shown in FIG. 4, when the current ILED1 flowing through the power receiving component LED1 such as the light-emitting diode is 400 mA, a voltage difference between the output voltage VOUT1 of the power converter and the voltage VLED1 of the power receiving component LED1 such as the light-emitting diode is extremely small. Under this condition, the switch circuit SW1 that is connected to the second terminal of the inductor L as the output terminal of the power converter of the present disclosure is not damaged due to overvoltage.

Figure 5:
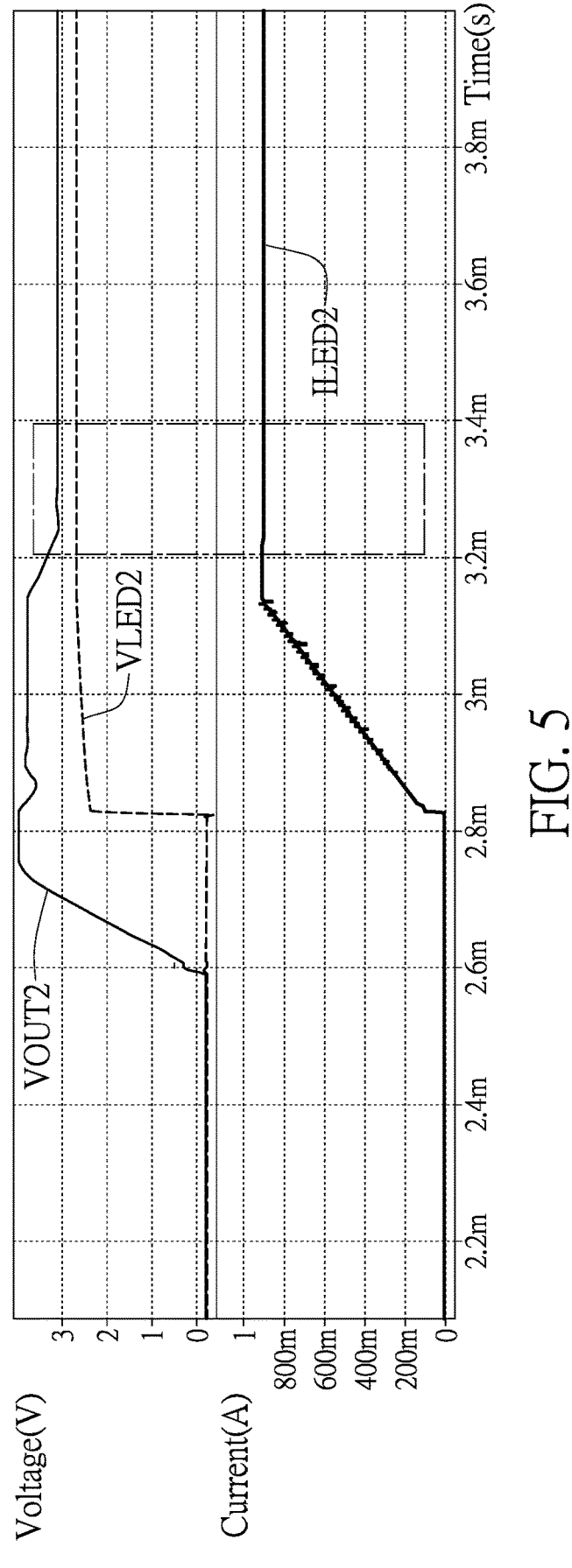
FIG. 5 is a waveform diagram of signals of the power converter for dynamically adjusting the voltage headroom based on the current according to the first to third embodiments of the present disclosure.

Reference is made to FIG. 5, which is a waveform diagram of signals of the power converter for dynamically adjusting the voltage headroom based on the current according to the first to third embodiments of the present disclosure.

The output voltage VOUT of the second terminal of the inductor L of the power converter as shown in FIG. 1 or FIG. 2 may be equal to an output voltage VOUT2 shown in FIG. 5.

The voltage of the power receiving component LED1 such as the light-emitting diode as shown in FIG. 1 or the voltage VLEDFB of the power receiving component LED1 as shown in FIG. 2 may be equal to a voltage VLED2 shown in FIG. 5.

The current flowing through the power receiving component LED1 such as the light-emitting diode as shown in FIG. 1 or FIG. 2 may be equal to a current ILED2 shown in FIG. 5.

A voltage difference between the output voltage VOUT2 of the power converter and the voltage VLED2 of the power receiving component LED1 such as the light-emitting diode is the voltage that the switch circuit SW1 withstands.

As shown in FIG. 5, when the current ILED2 flowing through the power receiving component LED1 such as the light-emitting diode is 900 mA, a voltage difference between the output voltage VOUT2 of the power converter and the voltage VLED2 of the power receiving component LED1 such as the light-emitting diode is extremely small. Under this condition, the switch circuit SW1 that is connected to the second terminal of the inductor L as the output terminal of the power converter of the present disclosure is not damaged due to overvoltage.

Figure 6:
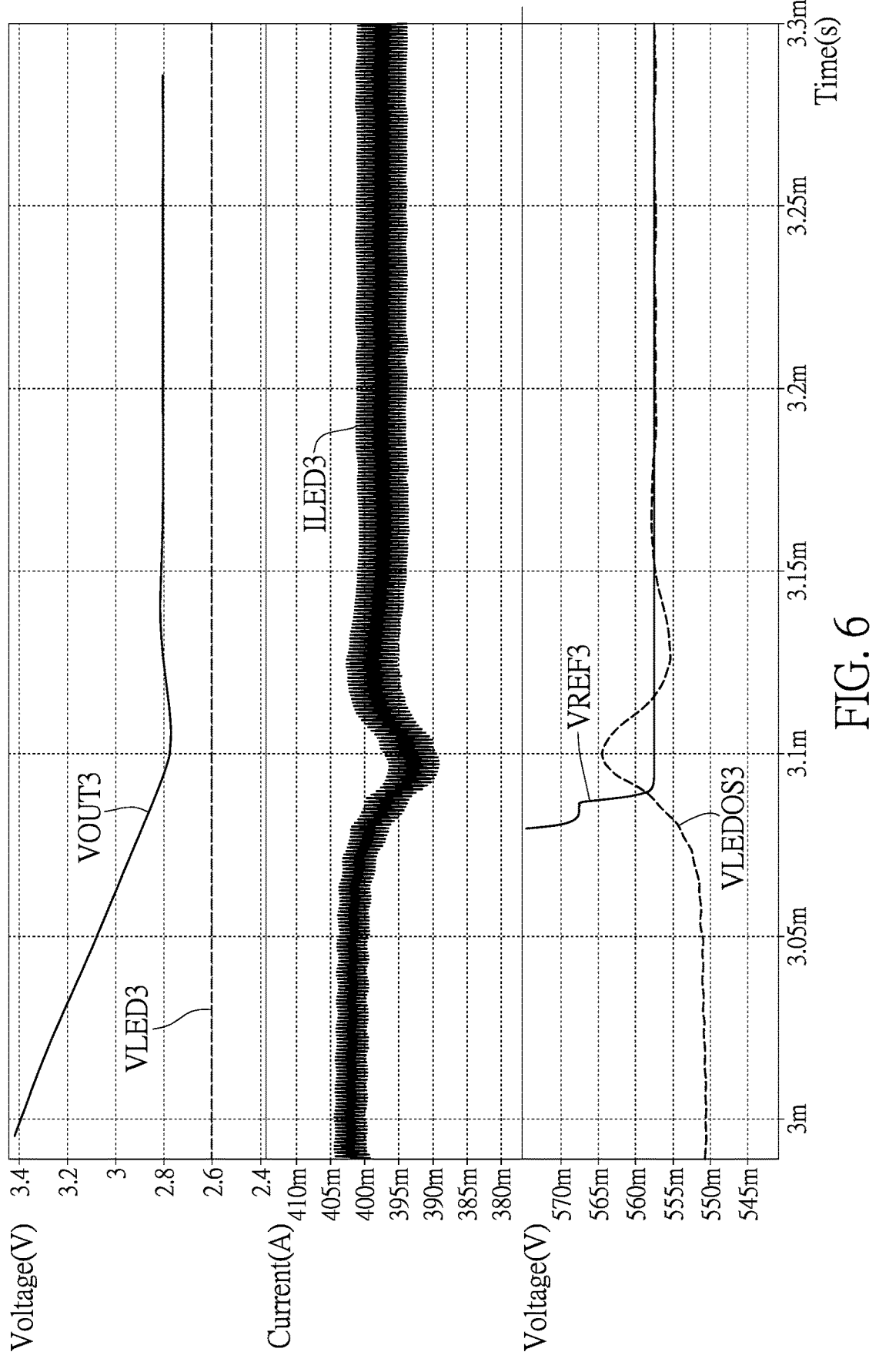
FIG. 6 is a waveform diagram of signals of the power converter for dynamically adjusting the voltage headroom based on the current according to the first to third embodiments of the present disclosure.

Reference is made to FIG. 6, which is a waveform diagram of signals of the power converter for dynamically adjusting the voltage headroom based on the current according to the first to third embodiments of the present disclosure.

The output voltage VOUT of the second terminal of the inductor L of the power converter as shown in FIG. 1 or FIG. 2 may be equal to an output voltage VOUT3 shown in FIG. 6.

The voltage of the power receiving component LED1 such as the light-emitting diode as shown in FIG. 1 or the voltage VLEDFB of the power receiving component LED1 as shown in FIG. 2 may be equal to a voltage VLED3 shown in FIG. 6.

The current flowing through the power receiving component LED1 such as the light-emitting diode as shown in FIG. 1 or FIG. 2 may be equal to a current ILED3 shown in FIG. 6.

The reference voltage VREF outputted by the reference voltage adjusting circuit VDAC of the power converter as shown in FIG. 1 or FIG. 2 may be equal to a reference voltage VREF3 shown in FIG. 6.

The voltage that is received from the feedback circuit MREF by the reference voltage adjusting circuit VDAC of the power converter shown in FIG. 1, or the voltage VLEDOS that is received from the feedback circuit MREF by the first input terminal of the comparator CMP of the reference voltage adjusting circuit VDAC of the power converter shown in FIG. 2, may be equal to a voltage VLEDOS3 shown in FIG. 6.

A voltage difference between the output voltage VOUT3 of the power converter and the voltage VLED3 of the power receiving component LED1 such as the light-emitting diode is the voltage that the switch circuit SW1 withstands.

As shown in FIG. 6, when the current ILED3 flowing through the power receiving component LED1 such as the light-emitting diode is 400 mA, a voltage difference between the output voltage VOUT3 of the power converter and the voltage VLED3 of the power receiving component LED1 such as the light-emitting diode is extremely small. Under this condition, the switch circuit SW1 that is connected to the second terminal of the inductor L as the output terminal of the power converter of the present disclosure is not damaged due to overvoltage.

As shown in FIG. 6, the counter circuit CUT counts down the reference voltage VREF multiple times for decreasing the reference voltage VREF with an increase in the voltage VLEDOS3 of the first input terminal of the comparator CMP multiple times. Finally, the counter circuit CUT maintains the reference voltage VREF at the appropriate voltage value.

Figure 7:
FIG. 7 is a waveform diagram of signals of the power converter for dynamically adjusting the voltage headroom based on the current according to the first to third embodiments of the present disclosure.

Reference is made to FIG. 7, which is a waveform diagram of signals of the power converter for dynamically adjusting the voltage headroom based on the current according to the first to third embodiments of the present disclosure.

The output voltage VOUT of the second terminal of the inductor L of the power converter as shown in FIG. 1 or FIG. 2 may be equal to an output voltage VOUT4 shown in FIG. 7.

The voltage of the power receiving component LED1 such as the light-emitting diode as shown in FIG. 1 or the voltage VLEDFB of the power receiving component LED1 as shown in FIG. 2 may be equal to a voltage VLED4 shown in FIG. 7.

The current flowing through the power receiving component LED1 such as the light-emitting diode as shown in FIG. 1 or FIG. 2 may be equal to a current ILED4 shown in FIG. 7. A voltage difference between the output voltage VOUT4 and the power converter and the voltage VLED4 of the power receiving component LED1 such as the light-emitting diode is the voltage that the switch circuit SW1 withstands.

As shown in FIG. 7, when the current ILED4 flowing through the power receiving component LED1 such as the light-emitting diode is 400 mA, a voltage difference between the output voltage VOUT4 of the power converter and the voltage VLED4 of the power receiving component LED1 such as the light-emitting diode is only 204 mV. Under this condition, the switch circuit SW1 that is connected to the second terminal of the inductor L as the output terminal of the power converter of the present disclosure is not damaged due to overvoltage.

11                                                                              12

Figure 8:
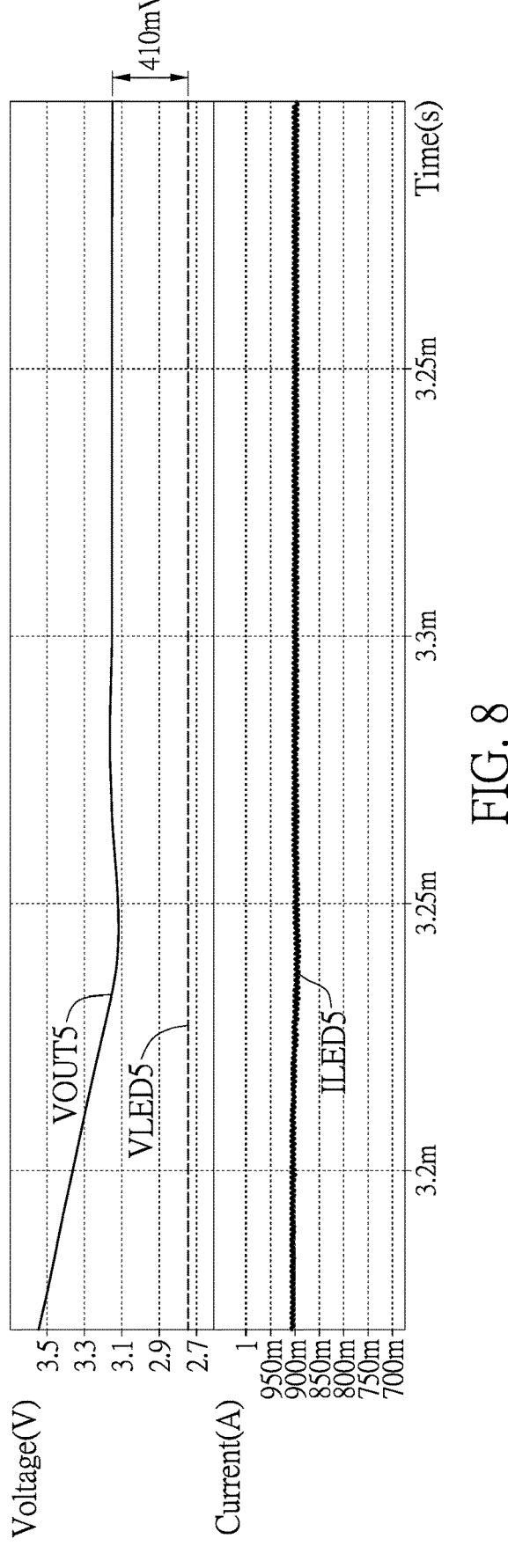
FIG. 8 is a waveform diagram of signals of the power converter for dynamically adjusting the voltage headroom based on the current according to the first to third embodiments of the present disclosure.

Reference is made to FIG. 8, which is a waveform diagram of signals of the power converter for dynamically adjusting the voltage headroom based on the current according to the first to third embodiments of the present disclosure.

The output voltage VOUT of the second terminal of the inductor L of the power converter as shown in FIG. 1 or FIG. 2 may be equal to an output voltage VOUT5 as shown in FIG. 8.

The voltage of the power receiving component LED1 such as the light-emitting diode as shown in FIG. 1 or the voltage VLEDFB of the power receiving component LED1 as shown in FIG. 2 may be equal to a voltage VLED5 as shown in FIG. 8.

The current flowing through the power receiving component LED1 such as the light-emitting diode as shown in FIG. 1 or FIG. 2 may be equal to a current ILED5 as shown in FIG. 8.

A voltage difference between the output voltage VOUT5 of the power converter and the voltage VLED5 of the power receiving component LED1 such as the light-emitting diode is the voltage that the switch circuit SW1 withstands.

As shown in FIG. 8, when the current ILED5 flowing through the power receiving component LED1 such as the light-emitting diode is 900 mA, a voltage difference between the output voltage VOUT5 of the power converter and the voltage VLED5 of the power receiving component LED1 such as the light-emitting diode is only 410 mV. Under this condition, the switch circuit SW1 that is connected to the second terminal of the inductor L as the output terminal of the power converter of the present disclosure is not damaged due to overvoltage.

In conclusion, the present disclosure provides the power converter for dynamically adjusting the voltage headroom based on the current. The power converter of the present disclosure senses a change in a current flowing to the power receiving component such as the light-emitting diode. The power converter of the present disclosure dynamically adjusts control of the high-side switch and the low-side switch in real time according to the change in the sensed current so as to adjust the current flowing to the light-emitting diode sequentially through the inductor and the switch circuit for adjusting voltages of the light-emitting diode and the switch circuit. As a result, the voltage headroom is dynamically adjusted with the change in the current. Therefore, by the power converter of the present disclosure, the light-emitting diode and the switch circuit are prevented from being damaged due to overvoltage. The unnecessary power consumption is not generated in the power converter of the present disclosure. The power converter of the present disclosure drives the light-emitting diode to emit light as desired under the condition of minimum power loss.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A power converter for dynamically adjusting voltage headroom based on a current, comprising:
   a high-side switch, wherein a first terminal of the high-side switch is coupled with an input voltage;
   a low-side switch, wherein a first terminal of the low-side switch is connected to a second terminal of the high-side switch, a second terminal of the low-side switch is grounded, and a node between the first terminal of the low-side switch and the second terminal of the high-side switch is connected to a first terminal of an inductor;
   a sensor circuit connected to a power receiving component, wherein the power receiving component is connected to a second terminal of the inductor, and the sensor circuit is configured to sense a current flowing to the power receiving component to output a sensed current;
   a current source having an input terminal coupled with the input voltage;
   a mirror circuit including:
      a first transistor, wherein a first terminal of the first transistor is connected to the sensor circuit, and a second terminal of the first transistor is grounded; and
      a second transistor, wherein a first terminal of the second transistor is connected to the first terminal and a control terminal of the first transistor, a first terminal of the second transistor is connected to an output terminal of the current source, and a second terminal of the second transistor is grounded;
   a reference voltage adjusting circuit connected to a reference node between the first terminal of the second transistor and the output terminal of the current source, wherein the current source supplies a set current to the reference node, and the reference voltage adjusting circuit sets a reference voltage according to a current that flows from the reference node to the reference voltage adjusting circuit; and
   a control circuit connected to the reference voltage adjusting circuit, a control terminal of the high-side switch and a control terminal of the low-side switch, and configured to control the high-side switch and the low-side switch according to the reference voltage.

2. The power converter according to claim 1, wherein the power receiving component includes a light-emitting component.

3. The power converter according to claim 2, wherein the light-emitting component is a light-emitting diode, an anode of the light-emitting diode is connected to the second terminal of the inductor, and a cathode of the light-emitting diode is grounded.

4. The power converter according to claim 1, further comprising:
   an output capacitor, wherein a first terminal of the output capacitor is connected to the second terminal of the inductor, and a second terminal of the output capacitor is grounded.

5. The power converter according to claim 4, wherein the control circuit is connected to the first terminal of the output capacitor, and is configured to control the high-side switch and the low-side switch according to a voltage of the first terminal of the output capacitor.

6. The power converter according to claim 1, wherein the set current that is supplied to the reference node by the current source is a sum of the current that flows from the reference node to the reference voltage adjusting circuit and a current that flows to the first terminal of the second transistor from the reference node.

7. The power converter according to claim 1, wherein a switch circuit is connected between the second terminal of the inductor and the power receiving component, the switch circuit is further connected to the sensor circuit, and the sensor circuit senses a current flowing to the switch circuit to output the sensed current.

8. The power converter according to claim 1, wherein the reference voltage adjusting circuit includes:
   a comparator, wherein a first input terminal of the comparator is connected to the reference node between the first terminal of the second transistor and the output terminal of the current source; and
   a counter circuit connected to an output terminal of the comparator, a second input terminal of the comparator and the control circuit, wherein the counter circuit outputs the reference voltage to the second input terminal of the comparator, and the counter circuit counts the reference voltage outputted to the control circuit according to a determining signal from the output terminal of the comparator for adjusting the reference voltage outputted to the control circuit.

9. The power converter according to claim 8, wherein the counter circuit counts the reference voltage outputted to the second input terminal of the comparator according to the determining signal from the output terminal of the comparator for adjusting the reference voltage outputted to the second input terminal of the comparator.

10. The power converter according to claim 8, wherein, when the set current of the current source is smaller than or equal to the sensed current, a voltage of the first input terminal of the comparator is smaller than or equal to a voltage of the power receiving component.

11. The power converter according to claim 8, wherein, when the set current of the current source is smaller than or equal to the sensed current, the reference voltage is higher than or equal to a voltage of the first input terminal of the comparator.

12. The power converter according to claim 8, wherein, when the set current of the current source is larger than the sensed current, a voltage of the first input terminal of the comparator is higher than a voltage of the power receiving component.

13. The power converter according to claim 8, wherein, when the set current of the current source is larger than the sensed current, the reference voltage is lower than a voltage of the first input terminal of the comparator.

14. The power converter according to claim 8, wherein the counter circuit initially sets the reference voltage to be equal to a maximum reference voltage value, and counts down the reference voltage multiple times from the maximum reference voltage value for decreasing the reference voltage multiple times.

15. The power converter according to claim 14, wherein, when a voltage of the first input terminal of the comparator is lower than or equal to a voltage of the power receiving component or the reference voltage is higher than or equal to the voltage of the first input terminal of the comparator, the counter circuit continually counts down the reference voltage for decreasing the reference voltage.

16. The power converter according to claim 15, wherein, when the voltage of the first input terminal of the comparator is higher than the voltage of the power receiving component and the reference voltage is lower than the voltage of the first input terminal of the comparator, the counter circuit stops counting down the reference voltage.

17. The power converter according to claim 16, wherein, after the counter circuit stops counting down the reference voltage, the control circuit maintains the reference voltage.

18. The power converter according to claim 8, further comprising:
   a resistor, wherein a first terminal of the resistor is connected to the power receiving component, and a second terminal of the resistor is connected to the first input terminal of the comparator.

19. The power converter according to claim 1, wherein a current value of the set current that is supplied to the reference node by the current source is a variable current value.

20. The power converter according to claim 1, wherein, in the mirror circuit, a ratio of a current flowing through the first terminal of the first transistor to a current flowing through the first terminal of the second transistor is 1:N, wherein the N is a variable value.

* * * * *